United States Patent
Callaghan et al.

(10) Patent No.: US 10,006,568 B2
(45) Date of Patent: Jun. 26, 2018

(54) DOUBLE WALLED TUBE AND MANUFACTURE THEREOF

(71) Applicant: United Technologies Corporation, Farmington, CT (US)

(72) Inventors: Craig M. Callaghan, East Granby, CT (US); Gregory S. Scheiferstein, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 100 days.

(21) Appl. No.: 15/174,311

(22) Filed: Jun. 6, 2016

(65) Prior Publication Data
US 2017/0350540 A1 Dec. 7, 2017

(51) Int. Cl.
*F16L 9/18* (2006.01)

(52) U.S. Cl.
CPC .................................... *F16L 9/18* (2013.01)

(58) Field of Classification Search
CPC ....... F16L 9/18; F16L 9/19; F16L 9/20; F16L 9/22; F16L 11/20
USPC .............................. 138/112–114; 285/123.15
See application file for complete search history.

(56) References Cited

U.S. PATENT DOCUMENTS

| | | |
|---|---|---|
| 2,737,543 A | 3/1956 | Irwin |
| 3,343,250 A | 9/1967 | Berto |
| 4,250,927 A | 2/1981 | Newburg |
| 4,645,244 A | 2/1987 | Curtis |
| 5,028,078 A | 7/1991 | Schwarz |
| 5,225,016 A | 7/1993 | Sart |
| 5,340,163 A | 8/1994 | Merrer |
| 5,497,809 A * | 3/1996 | Wolf .................. F16L 9/18 138/113 |
| 6,145,547 A | 11/2000 | Villatte |
| 6,487,860 B2 | 12/2002 | Mayersky |
| 6,786,275 B2 | 9/2004 | Dey |
| 7,913,718 B1 * | 3/2011 | Cornwall ........... F16L 9/21 138/112 |
| 7,992,390 B2 | 8/2011 | Patel |
| 2004/0026922 A1 | 2/2004 | Carns et al. |
| 2013/0087238 A1 | 4/2013 | Mercier |
| 2015/0369400 A1 | 12/2015 | Dill |
| 2016/0010868 A1 | 1/2016 | Pinnick |

OTHER PUBLICATIONS

Parker, "Instrument Tube Fitting Installation Manual", Bulletin 4200-B4, Feb. 2006.

(Continued)

*Primary Examiner* — Patrick F Brinson
(74) *Attorney, Agent, or Firm* — O'Shea Getz P.C.

(57) ABSTRACT

Aspects of the disclosure are directed to a tube assembly comprising: a first tube having a radial exterior surface, a second tube composed of a plurality of segments, the first tube co-axially nested within the second tube, at least a first spacer coupled to the first tube, and a second spacer coupled to the at least a first spacer, where a first segment of the plurality of segments is coupled to a first axial end of the second spacer, and a second segment of the plurality of segments is coupled to a second axial end of the second spacer.

19 Claims, 16 Drawing Sheets

(56) References Cited

OTHER PUBLICATIONS

IHS Engineering 360, "Hydaulic Fittings Information", available from <http://www.globalspec.com/learnmore/flow_control_fluid_transfer/pipe_tubing_hose_accessories/hydraulic_fittings>, Apr. 7, 2016.
Parker, "Fluoropolymer Hose & Fittings Products, PAGE Product Line, Flexible Braided Hose Catalog 5162F", 2014.
WolfBend LLC, Double Wall Tube Bending Systems, "A Lightweight, Patented System That Makes Bending Tube-Within-A-Tube Practical and Easy", accessed from <http://wolfbend.com/index.htm> on Apr. 13, 2016.
Extended EP Search Report for EP Patent Appln. No. 17174631.6 dated Oct. 20, 2017.

* cited by examiner

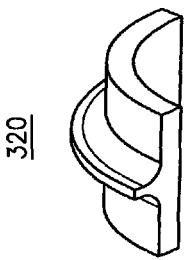
FIG. 3A  302
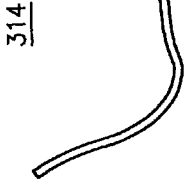
FIG. 3B  308
FIG. 3C  314
FIG. 3D  320
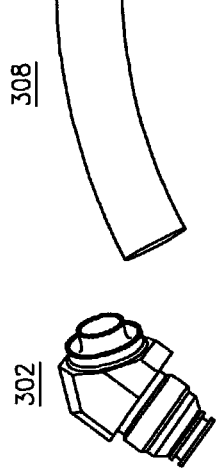
FIG. 3E  326
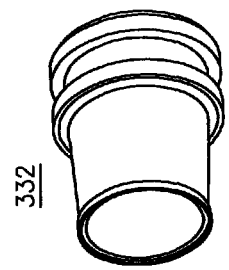
FIG. 3F  332
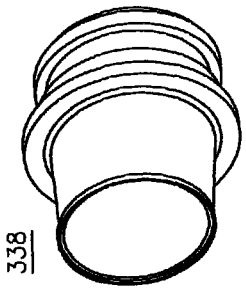
FIG. 3G  338
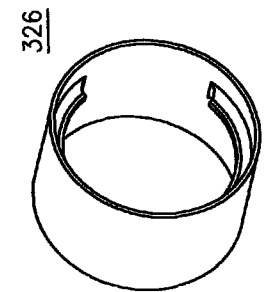

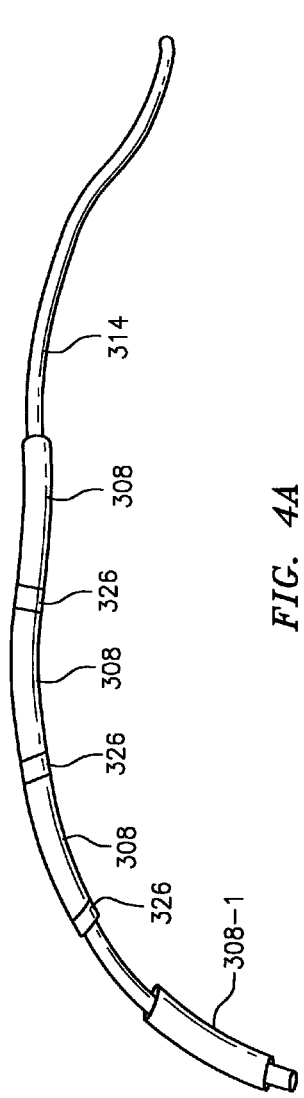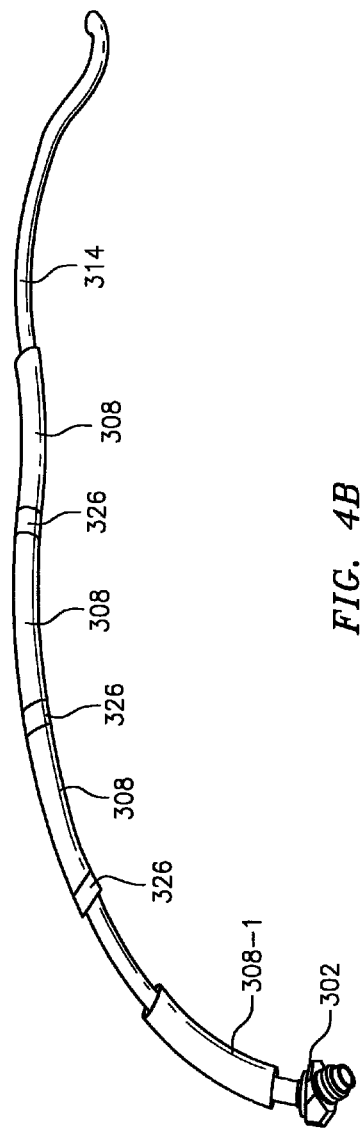

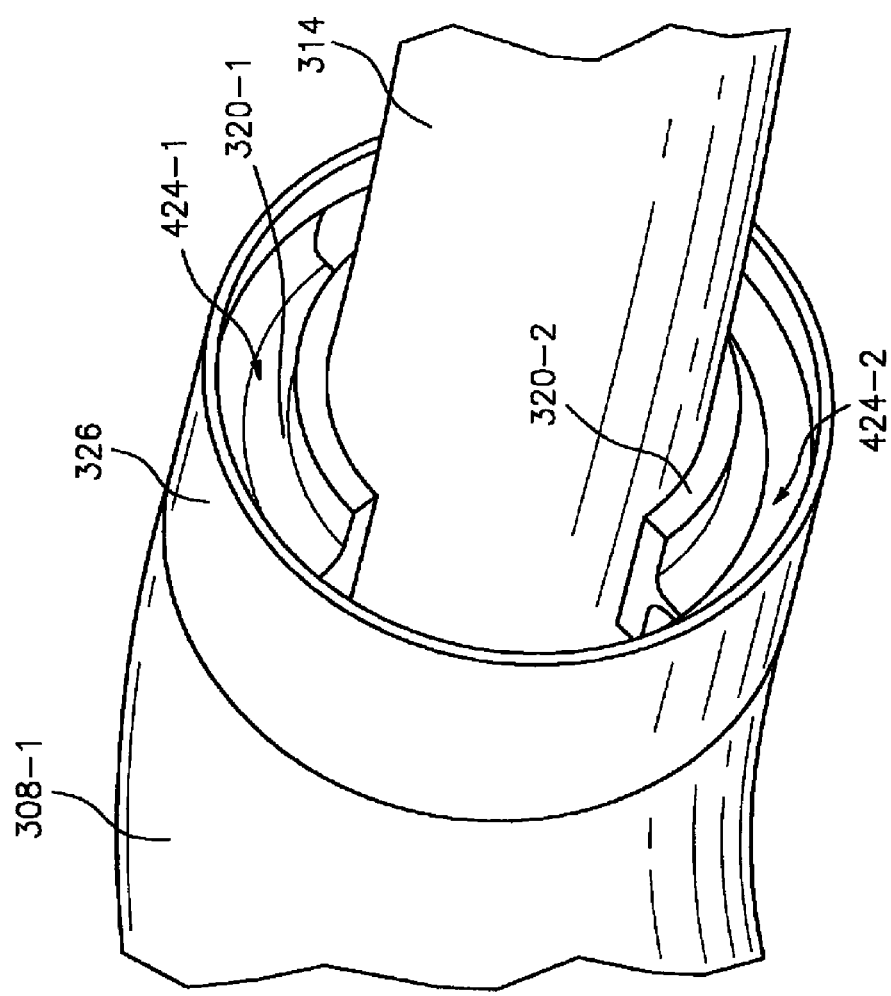

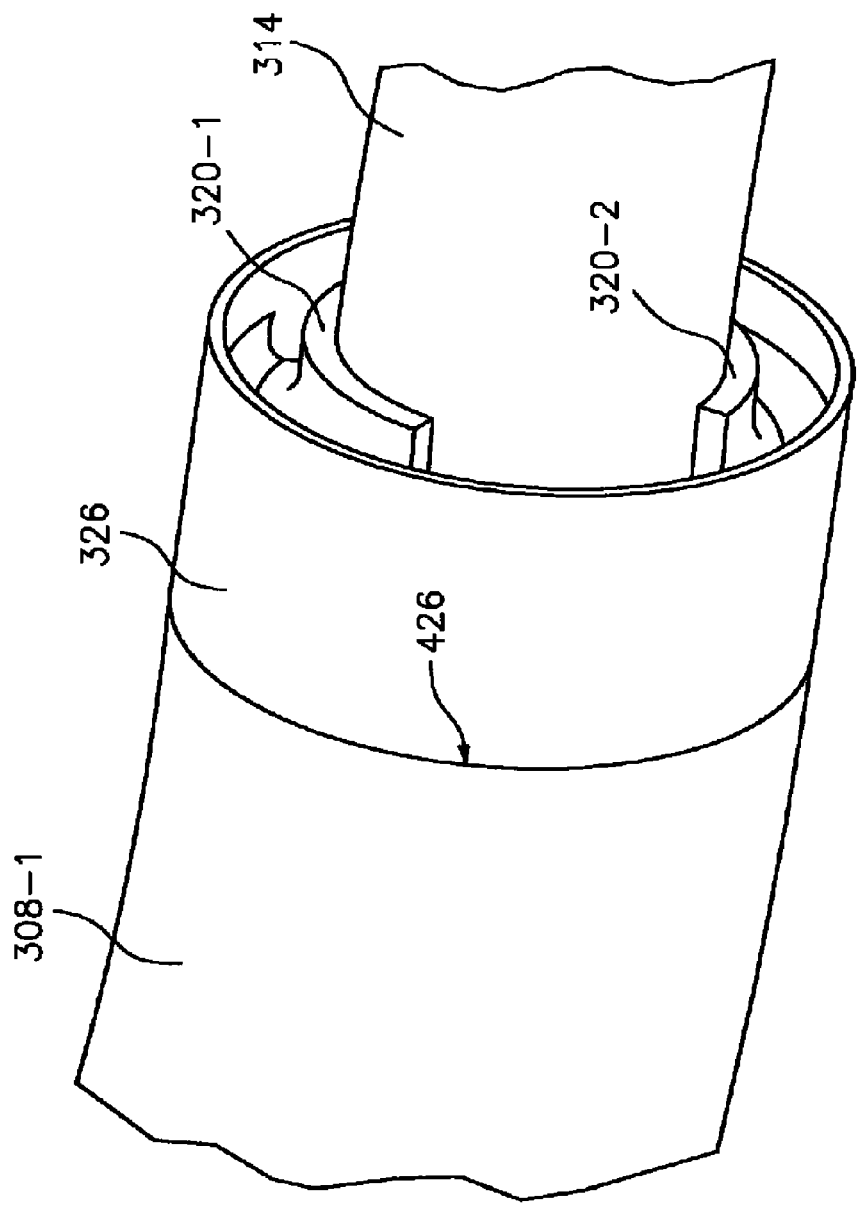

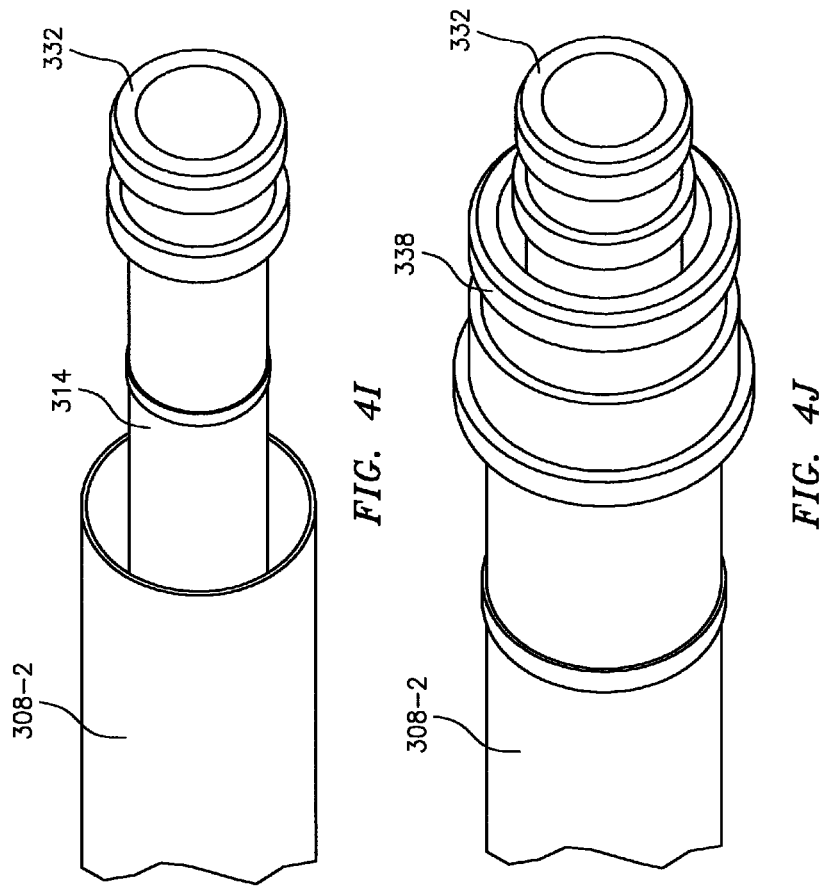

DOUBLE WALLED TUBE AND MANUFACTURE THEREOF

BACKGROUND

Gas turbine engines, such as those which power aircraft and industrial equipment, employ a compressor to compress air that is drawn into the engine and a turbine to capture energy associated with the combustion of a fuel-air mixture. One or more fluids are typically circulated throughout the engine. For example, oil may be supplied to one or more bearings in order to clean, cool, and lubricate the bearings.

Referring to FIG. 2A, the fluids are typically conveyed from a fluid source (e.g., an oil tank) 202 to the intended destination (e.g., the bearings or an associated bearing compartment) 206 by a supply tube 210. The fluid is then returned from the destination 206 to the source 202 by a return tube 214. In this manner, a closed-loop system 200 is established. There may be other components included; the system 200 is simplified for the sake of illustrative convenience. These other components may include additional tubes beyond the tubes 210 and 214.

Referring to FIG. 2B, in order to enhance reliability and avoid a leak impacting the performance/operability of the engine, the tubes (e.g., the tube 210 or the tube 214) may be manufactured as a double walled tube, where the fluid is intended to be conveyed by a first tube 232. A second tube 236 serves to contain any fluid that may leak from the first tube 232. The double walled tube arrangement shown in FIG. 2B is frequently referred to as a "tube within a tube" as the tube 236 has a larger dimension/diameter than the tube 232 and the tube 232 is contained/nested within the tube 236. In this respect, the tube 232 is an inner tube relative to the outer tube 236.

Referring to FIG. 2C, a system 250 is shown. The system 250 is shown as including five tube assemblies, denoted as assemblies 251, 252, 253, 254, and 255 (it is noted that the assemblies 252 and 253 may be implemented as a single assembly, resulting in four tube assemblies in FIG. 2C; for purposes of this disclosure, this distinction is of no import and is ignored going forward). Each of the assemblies 251-255 may correspond to a double walled arrangement as shown in FIG. 2B.

As shown in FIG. 2C, the assemblies 251-255 are separated from one another by hardware 261, 262, 263, and 264. The hardware 261-264 may support the assemblies 251-255 and provide a location for clamping the tube assembly and mounting the tube assembly to an engine structure (e.g., an engine case). The use of the hardware 261-264 represents a penalty/cost in terms of weight and complexity. The hardware 261-264 can also weaken/compromise the assemblies 251-255 (e.g., the tube 232 of FIG. 2B) at the point where the hardware interfaces to the assemblies.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a tube assembly comprising: a first tube having a radial exterior surface, a second tube composed of a plurality of segments, the first tube co-axially nested within the second tube, at least a first spacer coupled to the first tube, and a second spacer coupled to the at least a first spacer, where a first segment of the plurality of segments is coupled to a first axial end of the second spacer, and a second segment of the plurality of segments is coupled to a second axial end of the second spacer. In some embodiments, the tube assembly further comprises an end fitting coupled to the first tube. In some embodiments, the second tube is coupled to the end fitting. In some embodiments, the tube assembly further comprises a first ferrule coupled to the first tube. In some embodiments, the tube assembly further comprises a second ferrule coupled to the second tube. In some embodiments, a third segment of the plurality of segments is coupled to the second ferrule. In some embodiments, the at least a first spacer includes a first inner spacer and a second inner spacer. In some embodiments, a first center of the first inner spacer is aligned with a second center of the second inner spacer relative to an axial length of the first tube. In some embodiments, the first center and the second center are separated from one another by approximately one-hundred eighty degrees relative to a circumference of the first tube. In some embodiments, a first structure of the first inner spacer is separated from a second structure of the second inner spacer by a non-zero value of distance. In some embodiments, the first tube is configured to convey a fluid. In some embodiments, the fluid includes at least one of oil, fuel, hydraulic fluid, or air. In some embodiments, the second tube is configured to convey a second fluid. In some embodiments, the tube assembly is mounted to an engine of an aircraft.

Aspects of the disclosure are directed to a method comprising: sliding a plurality of outer tube segments onto an inner tube, using an outer spacer to separate a first and a second of the plurality of outer tube segments, attaching at least one inner spacer to the inner tube, attaching the outer spacer to the at least one inner spacer, attaching the outer spacer to the first outer tube segment, and attaching the outer spacer to the second outer tube segment. In some embodiments, the method further comprises attaching the inner tube to an end fitting. In some embodiments, the method further comprises attaching the first outer tube segment to the end fitting. In some embodiments, the method further comprises attaching an inner ferrule to the inner tube. In some embodiments, the method further comprises attaching an outer ferrule to the second outer tube segment. In some embodiments, the method further comprises attaching an outer ferrule to a third outer tube segment of the plurality of outer tube segments.

BRIEF DESCRIPTION OF THE DRAWINGS

The present disclosure is illustrated by way of example and not limited in the accompanying figures in which like reference numerals indicate similar elements. The drawings are not necessarily drawn to scale unless specifically indicated otherwise.

FIGS. 3A-3G illustrate components that may be used to manufacture a tube assembly in accordance with aspects of this disclosure.

FIGS. 4A-4J illustrate a tube assembly at various stages of manufacture.

DETAILED DESCRIPTION

Figure 1:
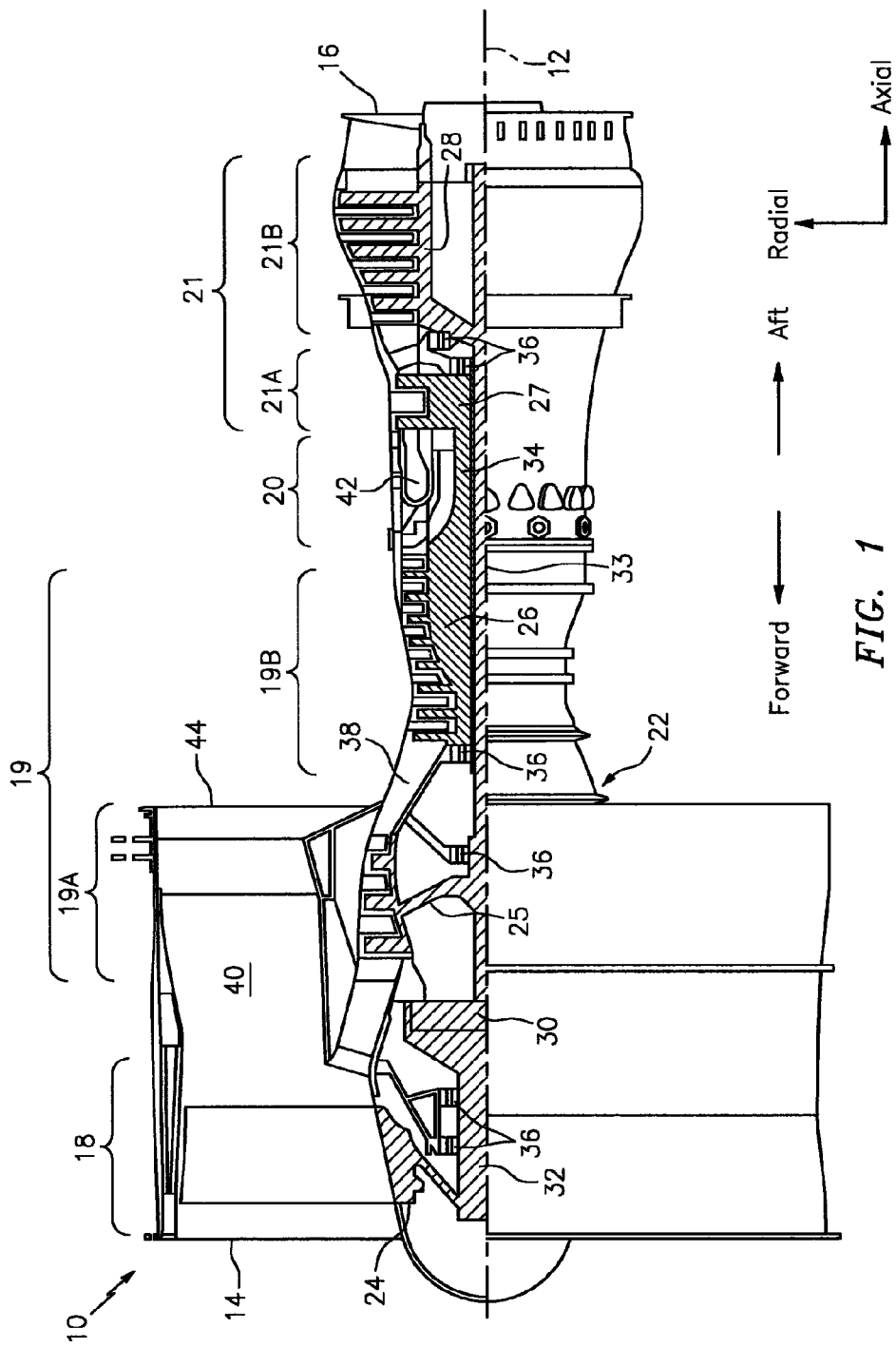
FIG. 1 is a side cutaway illustration of a geared turbine engine.
Figure 2A:
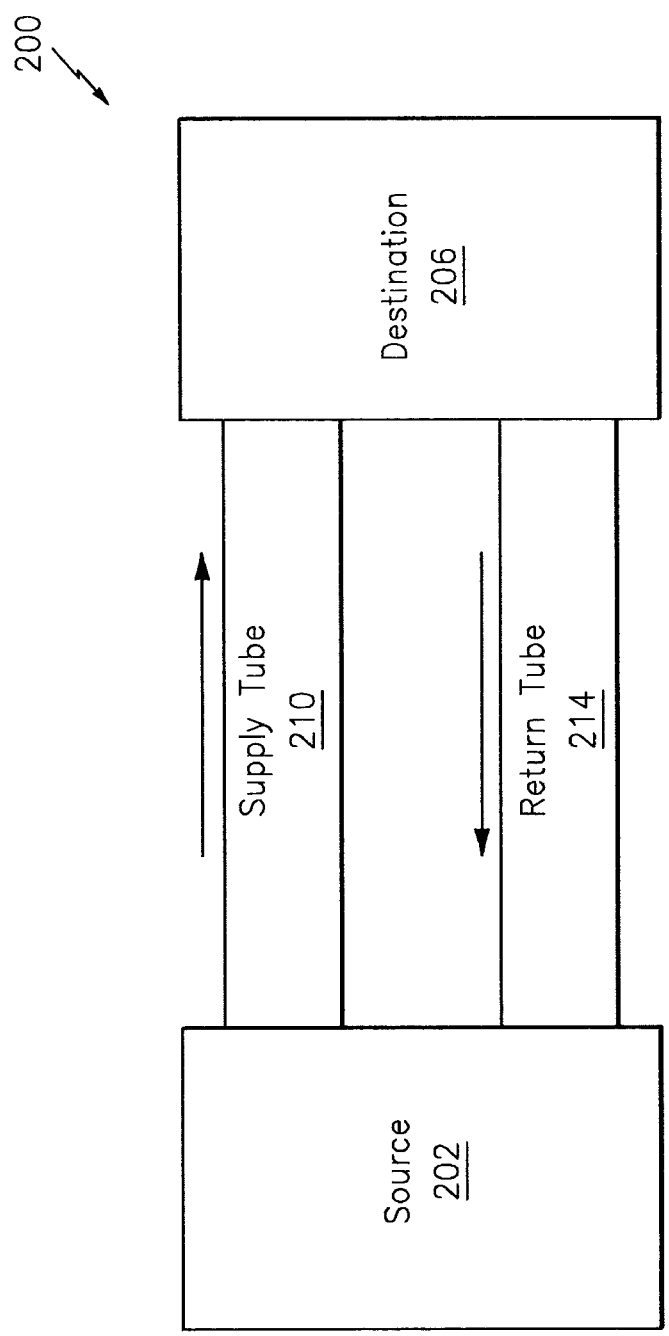
FIG. 2A illustrates a prior art system for circulating a fluid.
Figure 2B:
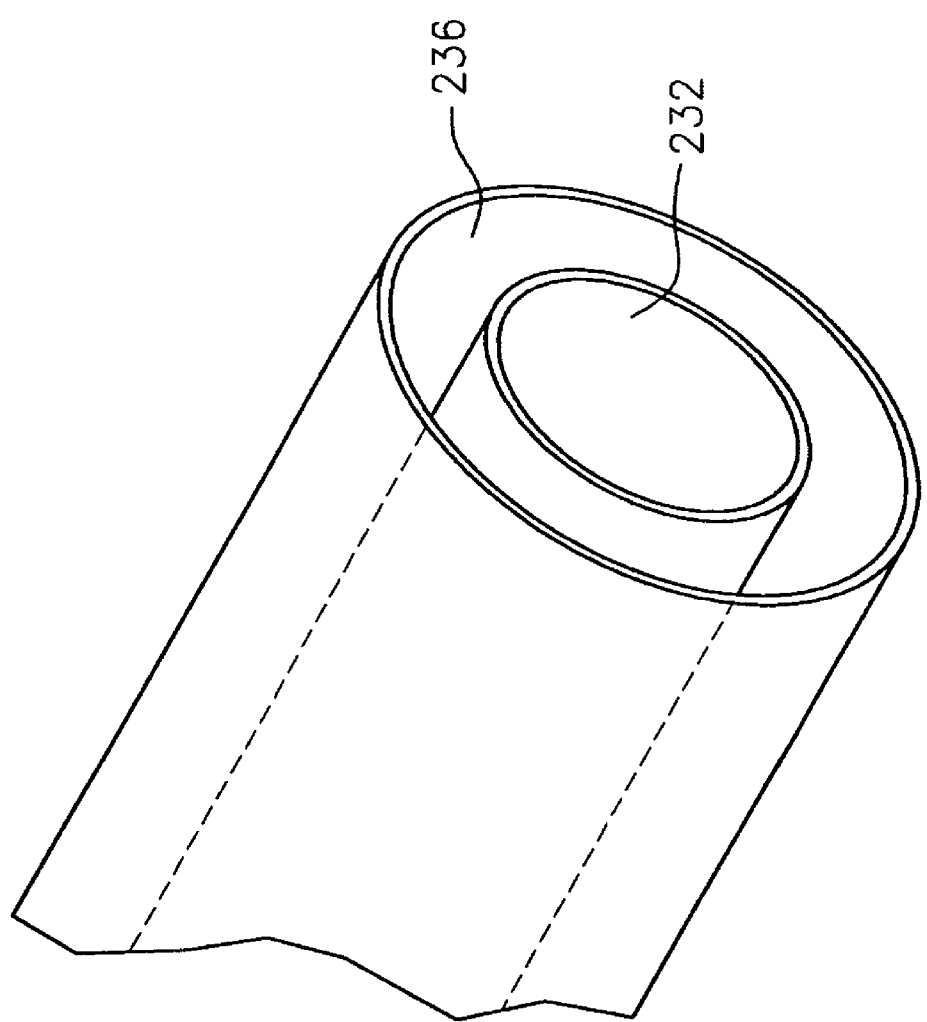
FIG. 2B illustrates a prior art double walled tube.
Figure 2C:
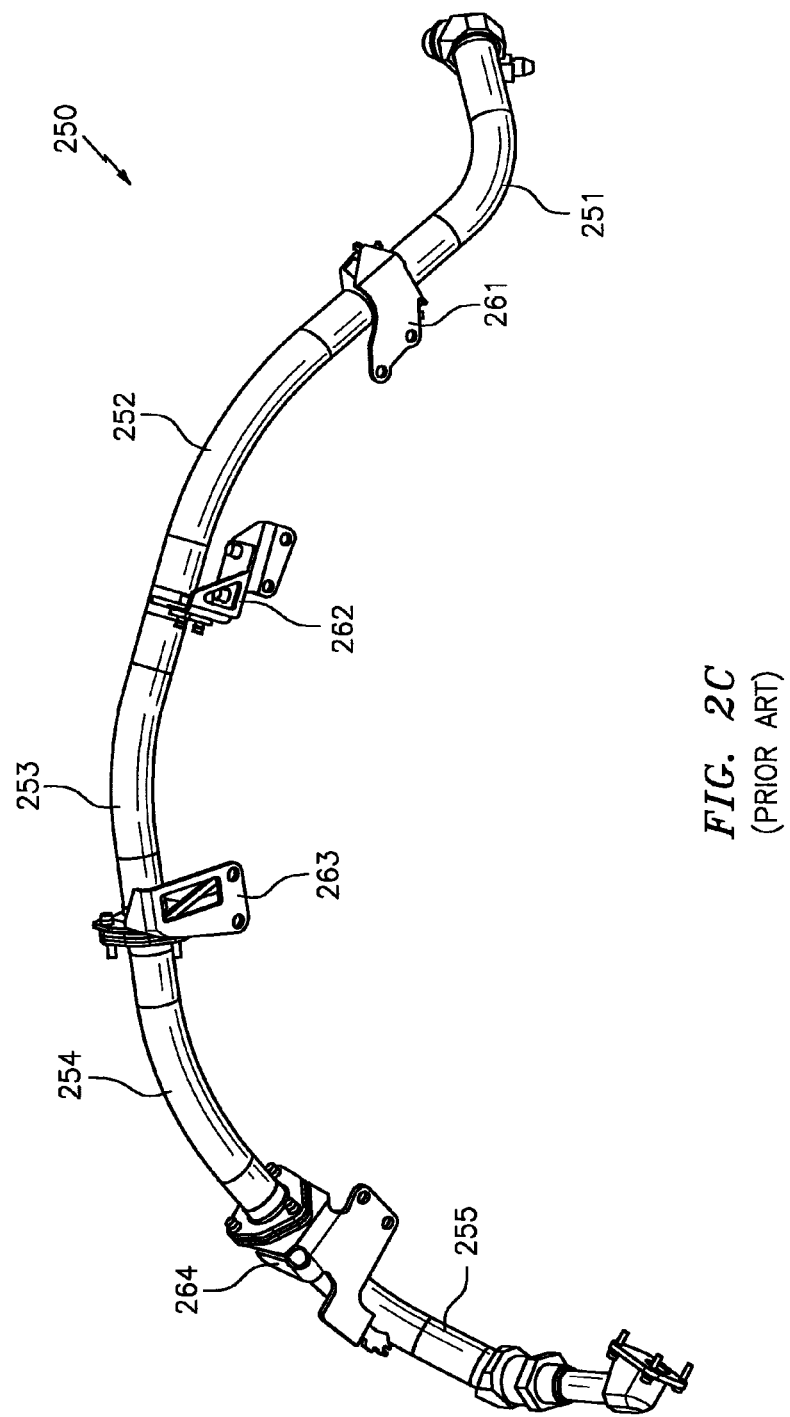
FIG. 2C illustrates a prior art system incorporating tube assemblies and associated hardware.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with aspects of the disclosure, apparatuses, systems, and methods are directed to a double walled arrangement for a tube assembly. The tube assembly may include a first, inner tube surrounded by a second, outer tube. The outer tube may be composed of segments; the inner tube may be a unitary tube/piece. The tube assembly may include one or more spacers to couple the inner tube and the outer tube to one another. One or more attachment techniques, such as welding or brazing for example, may be used in the manufacture of the tube assembly.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines.

Referring to FIGS. 3A-3G, various components used in the manufacture of a tube assembly are shown. In particular, FIGS. 3A-3G illustrate an end fitting 302, an outer tube segment 308, an inner tube 314, a portion of a first (inner) spacer 320, a second (outer) spacer 326, a first (inner) ferrule 332, and a second (outer) ferrule 338, respectively.

FIG. 4A-4J illustrate a tube assembly at various stages of manufacture, where the tube assembly is manufactured using the components depicted in FIGS. 3A-3G. The manufacture of the tube assembly is further described in relation to the method 500 of FIG. 5.

In block 500A (corresponding to FIG. 4A), outer tube segments 308-1 and 308 may be slid onto/on top of an inner tube 314. Outer spacers 326 may be used to separate the segments 308-1 and 308 from one another.

In block 500B (corresponding to FIG. 4B), the inner tube 314 may be attached (e.g., welded) to an end fitting 302.

In block 500C (corresponding to FIG. 4C), the outer tube segment 308-1 may be attached (e.g., welded) to the end fitting 302.

In block 500D (corresponding to FIG. 4D), two inner spacers 320-1 and 320-2 may be attached (e.g., welded) to the inner tube 314. The respective centers of the spacers 320-1 and 320-2 may be substantially aligned with one another relative to an axial length of the inner tube 314 and separated from one another by approximately one-hundred eighty degrees relative to a circumference of the inner tube 314. The structures of the spacers 320-1 and 320-2 may be separated from one another by a distance 420. Any non-zero value of the distance 420 may allow any fluid that escapes from/leaks out of the inner tube 314 to traverse the region between the inner pipe 314 and the outer pipe (or the outer pipe segments 308, 308-1, 308-2: see also FIG. 4H). Stated slightly differently, providing for a non-zero value of the distance 420 may help to prevent a build-up of any leaking fluid at the spacers 320-1 and 320-2 by providing a path for that leaked fluid to flow.

Figure 7:
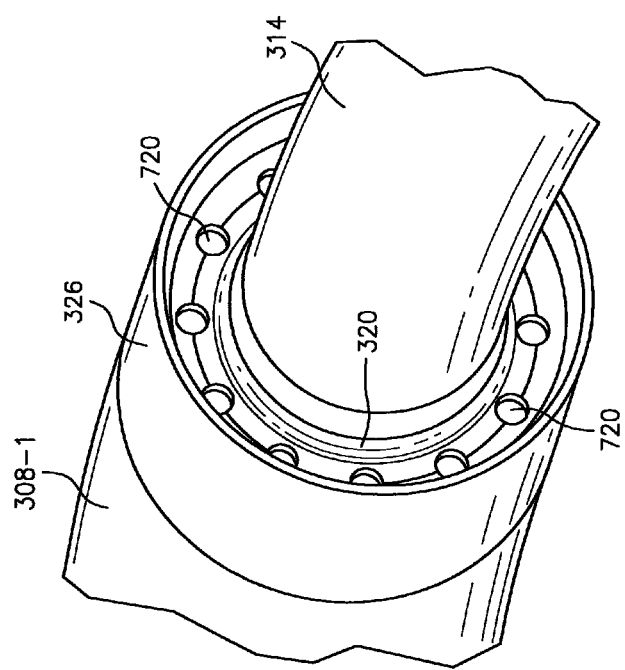
FIG. 7 illustrates an inner spacer with holes defined therein to enable a passage of fluid.

Referring to FIG. 7, in some embodiments a single/unitary inner spacer 320 may be used where the inner spacer 320 has one or more holes 720 through it to enable a passage of fluid therethrough. The use of the holes 720/unitary inner spacer 320 shown in FIG. 7 may represent an alternative to the use of the distance 420/multiple inner spacers 320-1 and 320-2 shown in FIG. 4D.

Referring back to FIG. 5, in block 500E (corresponding to FIG. 4E), the outer spacer 326 may be attached (e.g., welded) to the inner spacers 320-1 and 320-2. The attachment of block 500E may occur at the locations 424-1 and 424-2.

In block 500F (corresponding to FIG. 4F), the outer spacer 326 may be attached (e.g., welded) to the outer tube segment 308-1. The attachment of block 500F may occur at the location 426.

In block 500G (corresponding to FIG. 4G), the outer spacer 326 may be attached (e.g., welded) to the (next) outer tube segment 308. The attachment of block 500G may occur at the location 428.

Figure 4C:
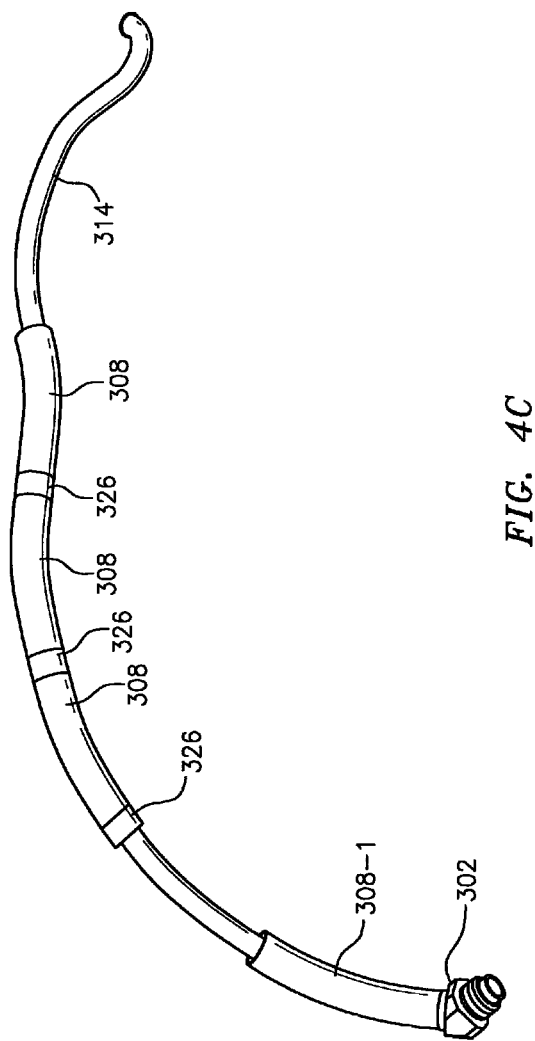
Figure 4D:
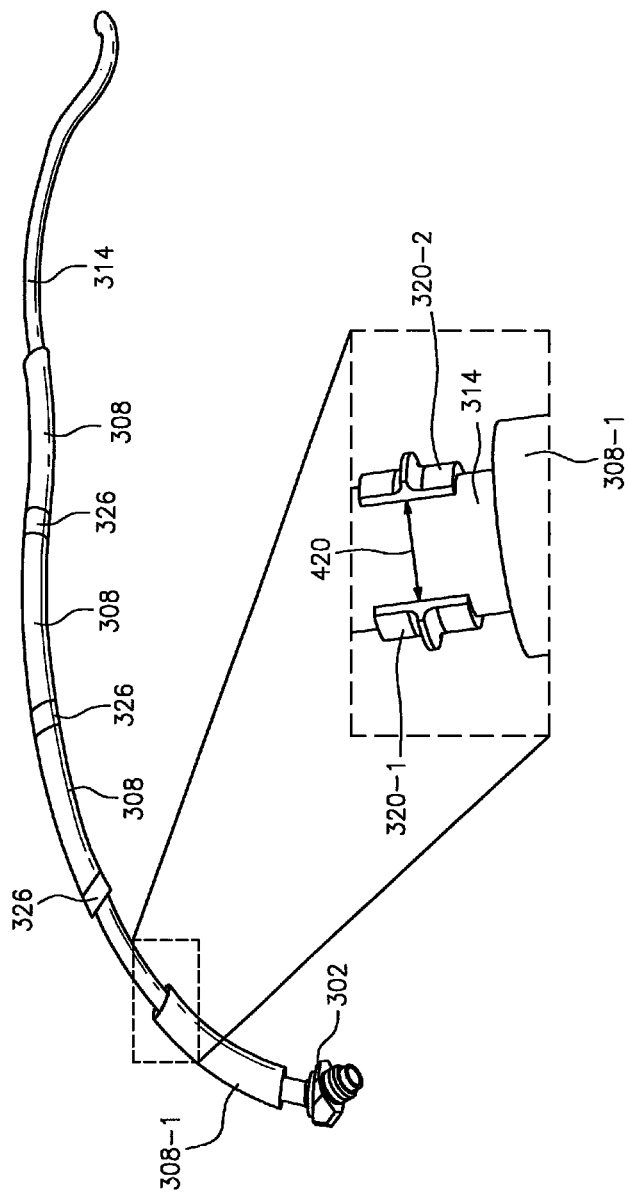
Figure 4G:
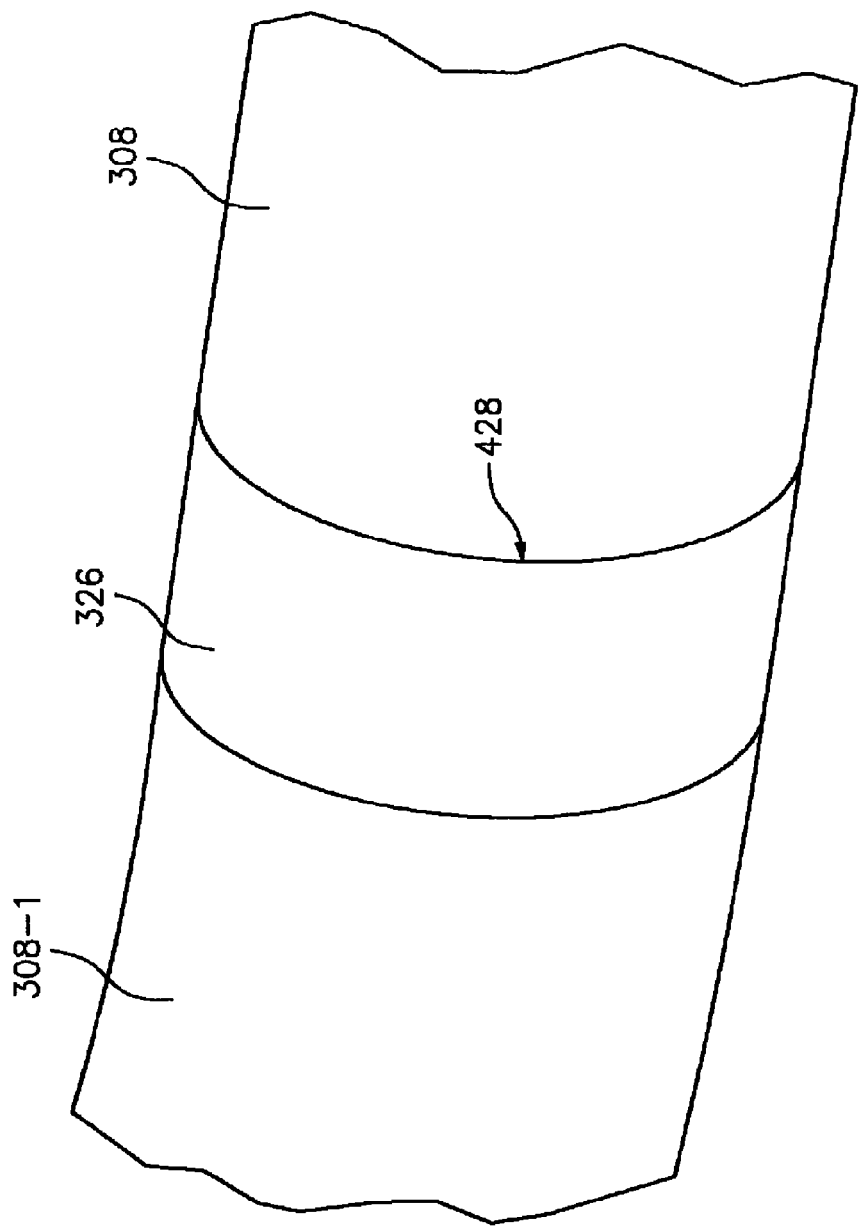
Figure 4H:
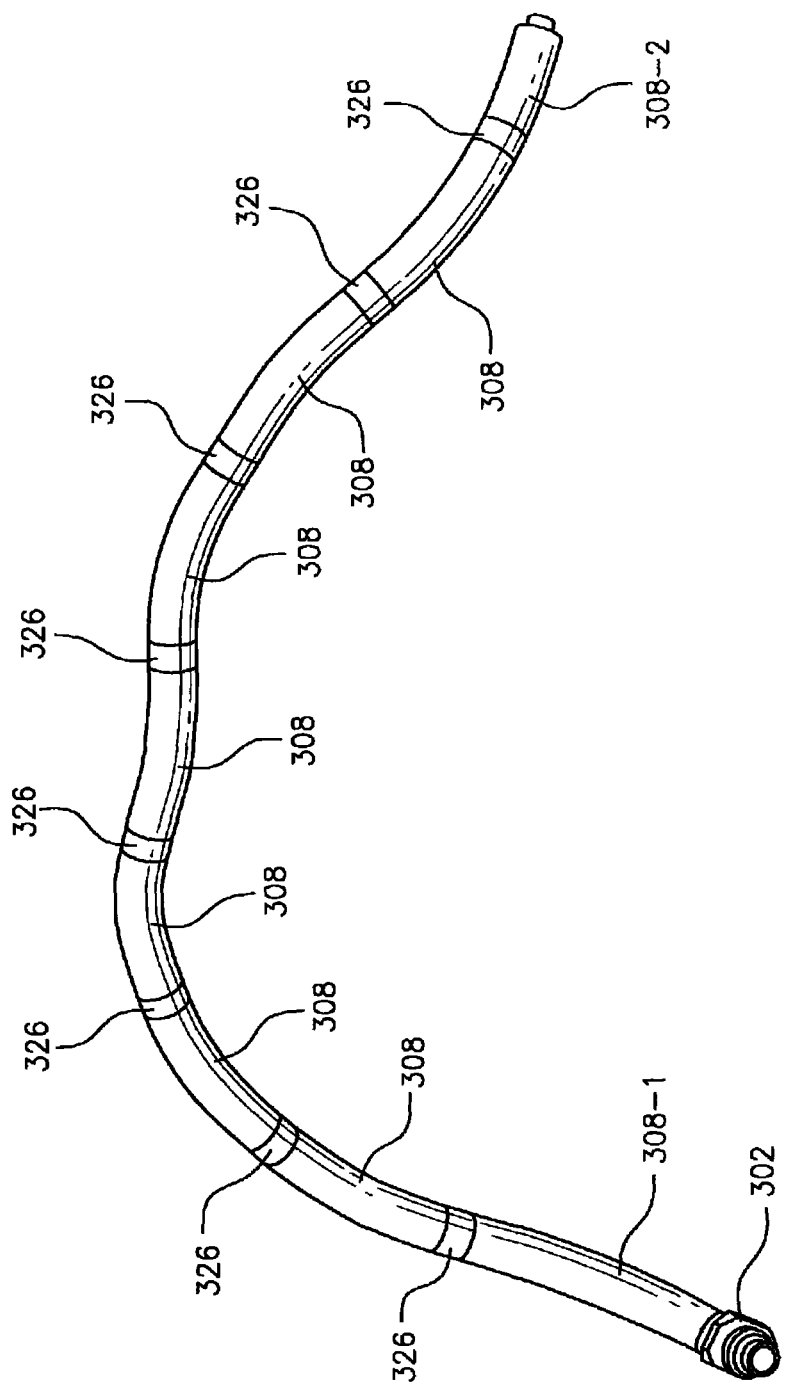

Referring to FIG. 4H, the tube assembly is shown as a result of having substantively repeated an execution of the blocks 500D-500G for successive instances of the inner spacers 320, the outer spacers 326, and outer tube segments 308, in relation to the inner tube 314. In FIG. 4H, the right-most outer-tube segment is denoted as segment 308-2 for purposes of further description/illustration in relation to FIGS. 4I-4J and blocks 500I-500J below.

In block 500I (corresponding to FIG. 4I), an inner ferrule 332 may be attached (e.g., welded) to the inner tube 314.

In block 500J (corresponding to FIG. 4J), an outer ferrule 338 may be attached (e.g., welded) to the outer tube segment 308-2.

Figure 5:
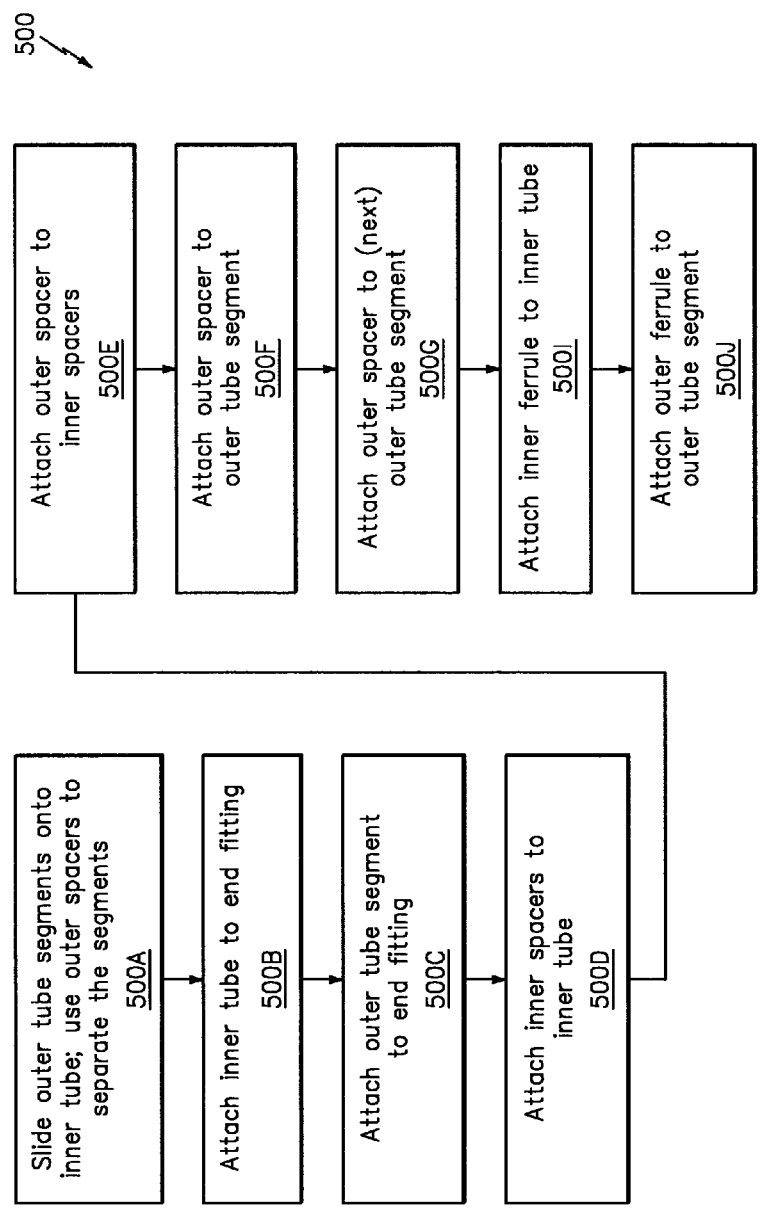
FIG. 5 illustrates a flow chart of an exemplary method that may be used to manufacture a tube assembly in accordance with aspects of this disclosure.

The order of the blocks/operations of the method 500 shown in FIG. 5 is illustrative. In some embodiments, one or more blocks (or one or more portions thereof) may execute in an order or sequence that is different from what is shown. One or more blocks (or one or more portions thereof) may be optional.

Figure 6:
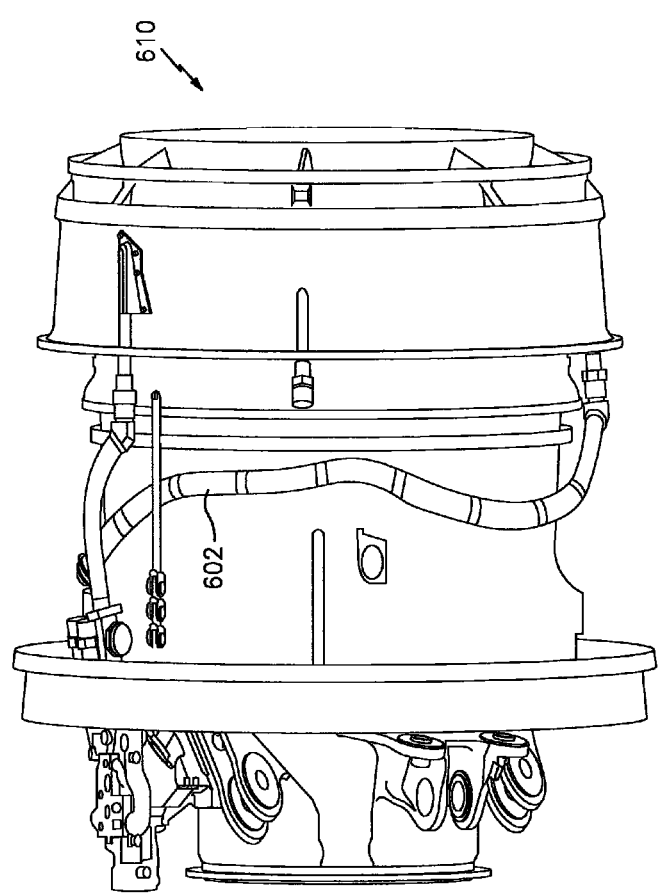
FIG. 6 illustrates a tube assembly mounted to an engine in accordance with aspects of this disclosure.

Referring to FIGS. 5-6, a tube assembly 602 manufactured via the method 500 is shown in a mounted state relative to a portion of an engine 610 (where the engine 610 may correspond to the engine 10 of FIG. 1).

The sizes/dimensions of the various components used in the manufacture of a tube assembly may be adapted to adhere to the particular application environment (e.g., engine) that the tube assembly is to be deployed on.

A tube assembly may convey one or more fluids, such as for example oil, fuel, hydraulic fluid, air, etc. The fluids may be conveyed by/within one or more of the tubes of the assembly. For example, in some embodiments a first tube may convey a first fluid and a second tube may convey a second fluid; the second fluid may be different from the first fluid.

One or more materials may be used in the manufacture of a tube assembly. For example, a component of the tube assembly may include one or more of steel, nickel, titanium, or aluminum.

Technical effects and benefits of this disclosure include a tube assembly that is less susceptible to leaking fluid relative to conventional tube assemblies. A tube assembly in accordance with aspects of this disclosure is also less complex, thereby reducing the manufacturing cost. A tube assembly in accordance with aspects of this disclosure is lighter than a conventional tube assembly, thereby increasing engine performance/efficiency.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A tube assembly comprising:
a first tube having a radial exterior surface;
a second tube composed of a plurality of segments, the first tube co-axially nested within the second tube;
at least a first spacer coupled to the first tube; and
a second spacer coupled to the at least a first spacer,
wherein a first segment of the plurality of segments is coupled to a first axial end of the second spacer,
wherein a second segment of the plurality of segments is coupled to a second axial end of the second spacer,
wherein the at least a first spacer includes a first inner spacer and a second inner spacer, and
wherein a first center of the first inner spacer is aligned with a second center of the second inner spacer relative to an axial length of the first tube.

2. The tube assembly of claim 1, further comprising:
an end fitting coupled to the first tube.

3. The tube assembly of claim 2, wherein the second tube is coupled to the end fitting.

4. The tube assembly of claim 1, further comprising:
a first ferrule coupled to the first tube.

5. The tube assembly of claim 4, further comprising:
a second ferrule coupled to the second tube.

6. The tube assembly of claim 5, wherein a third segment of the plurality of segments is coupled to the second ferrule.

7. The tube assembly of claim 1, wherein the first center and the second center are separated from one another by approximately one-hundred eighty degrees relative to a circumference of the first tube.

8. The tube assembly of claim 1, wherein a first structure of the first inner spacer is separated from a second structure of the second inner spacer by a non-zero value of distance.

9. The tube assembly of claim 1, wherein the first tube is configured to convey a fluid.

10. The tube assembly of claim 9, wherein the fluid includes at least one of oil, fuel, hydraulic fluid, or air.

11. The tube assembly of claim 9, wherein the second tube is configured to convey a second fluid.

12. The tube assembly of claim 1, wherein the tube assembly is mounted to an engine of an aircraft.

13. A method comprising:
sliding a plurality of outer tube segments onto an inner tube;
using an outer spacer to separate a first and a second of the plurality of outer tube segments;
attaching at least one inner spacer to the inner tube;
attaching the outer spacer to the at least one inner spacer;
attaching the outer spacer to the first outer tube segment; and
attaching the outer spacer to the second outer tube segment,
wherein the at least one inner spacer includes a first inner spacer and a second inner spacer, and
wherein a first center of the first inner spacer is aligned with a second center of the second inner spacer relative to an axial length of the inner tube.

14. The method of claim 13, further comprising:
attaching the inner tube to an end fitting.

15. The method of claim 14, further comprising:
attaching the first outer tube segment to the end fitting.

16. The method of claim 13, further comprising:
attaching an inner ferrule to the inner tube.

17. The method of claim 16, further comprising:
attaching an outer ferrule to the second outer tube segment.

18. The method of claim 16, further comprising:
attaching an outer ferrule to a third outer tube segment of the plurality of outer tube segments.

19. A tube assembly comprising:
a first tube having a radial exterior surface;
a second tube composed of a plurality of segments, the first tube co-axially nested within the second tube;
at least a first spacer coupled to the first tube; and
a second spacer coupled to the at least a first spacer,
wherein a first segment of the plurality of segments is coupled to a first axial end of the second spacer,
wherein a second segment of the plurality of segments is coupled to a second axial end of the second spacer,
wherein the at least a first spacer includes a first inner spacer and a second inner spacer, and
wherein a first structure of the first inner spacer is separated from a second structure of the second inner spacer by a non-zero value of distance.

* * * * *